US009676297B2

(12) United States Patent
Peniche et al.

(10) Patent No.: US 9,676,297 B2
(45) Date of Patent: Jun. 13, 2017

(54) CANTILEVER SNAP TAB ATTACHMENT DEVICE

(71) Applicant: FORD GLOBAL TECHNOLOGIES, LLC, Dearborn, MI (US)

(72) Inventors: Enrique Granell Peniche, Naucalpan de Juarez (MX); Edgardo Fabricio Ortiz Hernandez, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/624,661

(22) Filed: Feb. 18, 2015

(65) Prior Publication Data
US 2016/0236592 A1    Aug. 18, 2016

(51) Int. Cl.
*B60N 2/07* (2006.01)
*F16B 5/00* (2006.01)
*F16B 2/22* (2006.01)
*F16B 5/06* (2006.01)
*F16B 5/07* (2006.01)

(52) U.S. Cl.
CPC .............. *B60N 2/0725* (2013.01); *F16B 2/22* (2013.01); *F16B 5/0016* (2013.01); *F16B 5/0664* (2013.01); *F16B 5/07* (2013.01)

(58) Field of Classification Search
CPC ... B60N 2/0725; B60R 13/20; B60R 13/0206; Y10T 403/606; Y10T 24/44026; Y10T 24/45215; Y10S 292/38; E05C 19/06; E05C 19/063; E05C 19/066; F16B 5/0016
USPC ......... 403/329; 24/615, 625; 292/80, 81, 84, 292/87, 91, 303; 248/345.1, 424, 429, 248/430, 222.11, 222.13; 296/65.13
See application file for complete search history.

(56) References Cited

U.S. PATENT DOCUMENTS

| 3,409,858 A | * | 11/1968 | Krehbiel ................ H01R 13/62 174/138 F |
| 4,212,415 A | * | 7/1980 | Neely .................... B65D 83/06 220/324 |
| 4,541,036 A | * | 9/1985 | Landries .............. H01R 13/743 220/3.6 |
| 4,825,515 A | * | 5/1989 | Wolterstorff, Jr. ... A44B 11/263 24/196 |

(Continued)

FOREIGN PATENT DOCUMENTS

| DE | 10244328 A1 | 5/2004 |
| DE | 102011120490 A1 | 6/2013 |

OTHER PUBLICATIONS

Snap Fit Design, www.gotstogo.com/misc/engineering_info/snap_design.htm, 5 pages.

(Continued)

*Primary Examiner* — Jonathan Liu
*Assistant Examiner* — Guang H Guan
(74) *Attorney, Agent, or Firm* — Vichit Chea; King & Schickli, PLLC

(57) ABSTRACT

An attachment device is provided for securing a first workpiece to a second workpiece. The attachment device includes an attachment head and a receiver. The attachment head includes a cantilever snap tab, a first outboard locator tab and a second outboard locator tab. The receiver includes an opening for receiving and holding the cantilever snap tab, the first outboard locator tab and the second outboard locator tab.

6 Claims, 7 Drawing Sheets

(56) References Cited

U.S. PATENT DOCUMENTS

| | | | | |
|---|---|---|---|---|
| D345,293 S | * | 3/1994 | Bell | D8/331 |
| 5,529,297 A | | 6/1996 | Sawdon | |
| 5,577,779 A | * | 11/1996 | Dangel | E05C 19/06 220/326 |
| 5,657,893 A | * | 8/1997 | Hitchings | B65D 43/0222 220/284 |
| 5,699,601 A | * | 12/1997 | Gilliam | B25B 27/00 29/270 |
| 5,706,672 A | * | 1/1998 | Miyazaki | F24F 1/022 403/329 |
| 5,800,208 A | * | 9/1998 | Ishizuka | H01R 13/743 439/557 |
| 6,421,889 B1 | * | 7/2002 | Chien | A44B 11/266 24/614 |
| 6,478,346 B1 | * | 11/2002 | Veser | B01D 46/0004 292/19 |
| 6,684,466 B2 | * | 2/2004 | Nishida | A44B 11/263 24/614 |
| 6,901,632 B2 | * | 6/2005 | Boyce | E05D 15/505 16/227 |
| 7,909,371 B1 | * | 3/2011 | Mihlbauer | A01K 63/006 292/288 |
| 8,042,830 B2 | | 10/2011 | Hagelgans et al. | |
| 8,943,655 B2 | * | 2/2015 | Kabeya | B60R 11/0217 24/453 |
| 8,944,044 B2 | * | 2/2015 | Buck | F24C 15/108 126/214 A |
| 9,190,818 B2 | * | 11/2015 | Shiraki | H02G 3/088 |
| 2010/0272507 A1 | | 10/2010 | Khoe | |
| 2014/0159382 A1 | | 6/2014 | Canonge et al. | |
| 2015/0329082 A1 | * | 11/2015 | Shirai | B60N 2/0725 428/156 |
| 2016/0236592 A1 | * | 8/2016 | Peniche | B60N 2/0725 |

OTHER PUBLICATIONS

Snap Fit Calculator, www2.basf.us/businesses/pasticportal/pp_techRes_tools_snapfit_en.html, 1 page.
English translation of DE10244328.
English translation of DE102011120490.

* cited by examiner

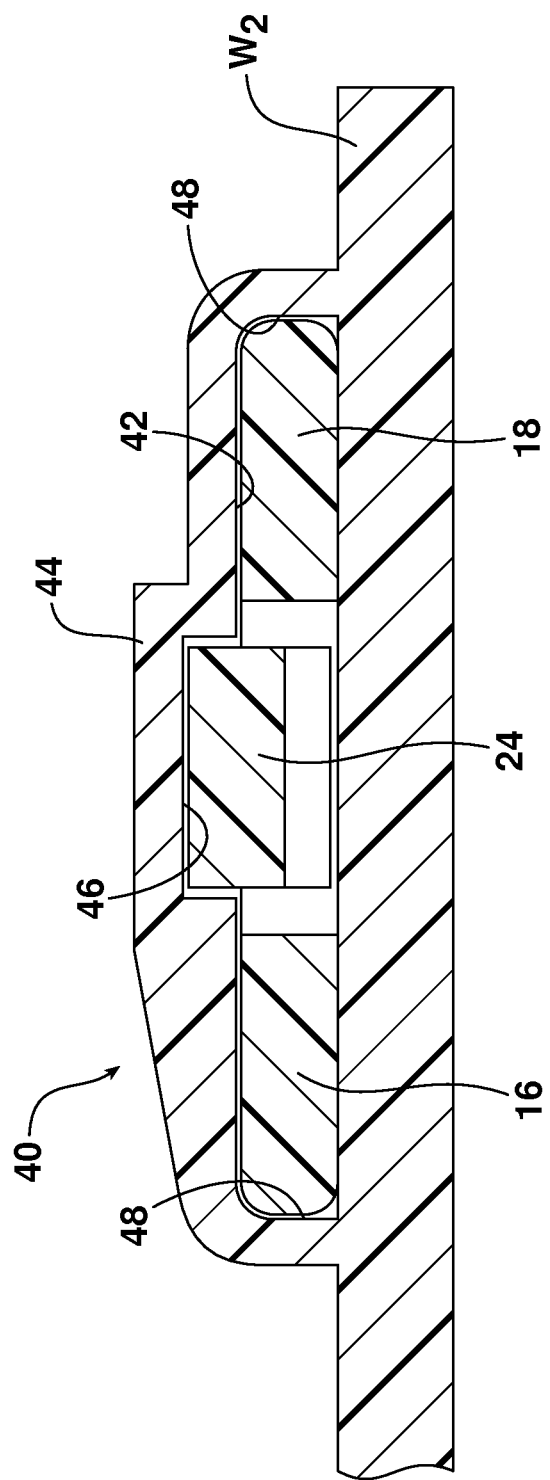

CANTILEVER SNAP TAB ATTACHMENT DEVICE

TECHNICAL FIELD

This document relates generally to attachment devices and, more particularly, to a new and improved attachment device incorporating a cantilever snap tab that is relatively inexpensive to produce, is easy to lock and unlock and that efficiently and effectively restricts different degrees of freedom to avoid movement between the work pieces that are connected together with the attachment device.

BACKGROUND

Attachment devices incorporating snap tabs are an efficient and effective way to secure two workpieces together. However, in the past, such devices have generally failed to provide the required restriction to all of the different degrees of freedom to eliminate play and undesired movement between the workpieces being connected together.

This document relates to a new and improved attachment device that addresses and solves this problem. The attachment device incorporates a cantilever snap tab. Advantageously, the attachment device can be packaged in a limited space, is relatively inexpensive to manufacture, very easy to lock and unlock and advantageously provides efficient and effective restriction of the different degrees of freedom to avoid movement between the workpieces being connected together and thereby provide a flush connection of high integrity between those workpieces.

SUMMARY

In accordance with the purposes and benefits described herein, an attachment device is provided for securing a first workpiece to a second workpiece. That attachment device comprises an attachment head including a cantilever snap tab, a first outboard locator tab and a second outboard locator tab. In addition, the attachment device also comprises a receiver including an opening for receiving and holding the cantilever snap tab, the first outboard locator tab and the second outboard locator tab.

More specifically, the attachment head includes a first gap between the cantilever snap tab and the first outboard locator tab. Further, the attachment includes a second gap between the cantilever snap tab and the second outboard locator tab. Thus, the cantilever snap tab includes a cantilever arm between the outboard locator tabs. A locking lug is provided on a distal end of the cantilever arm. Further, a first cam surface is provided on the locking lug. The first outboard locator tab includes a first free end having a first guide service while the second outboard locator tab includes a second free end having a second guide surface. In one possible embodiment, the first and second guide surfaces converge toward the locking lug so as to provide a centering function when the attachment head is secured in the receiver. In one possible embodiment, the two outboard locator tabs both include beveled edges to aid in completing a smooth connection between the attachment head and the receiver. In one possible embodiment, the receiver includes a u-shaped band. The u-shaped band includes a channel through which the locking tab passes as the attachment head is secured to the receiver. The locking lug at the end of the locking tab includes a locking shoulder that is offset from the first outboard locator tab and the second locator tab. This shoulder engages the u-shaped band at the channel when the attachment head is seated and fully secured in the receiver.

In accordance with an additional aspect, a seat rail cover is provided. The seat rail cover comprises a first cover section carrying an attachment head including a cantilever snap tab, a first outboard locator tab and a second outboard locator tab. Further the seat rail cover includes a second cover section carrying a receiver including an opening for receiving and holding the cantilever snap tab, the first outboard locator tab and the second outboard locator tab.

In the following description, there are shown and described several preferred embodiments of the attachment device as well as of the seat rail cover. As it should be realized, the attachment device and seat rail cover are capable of other, different embodiments and their several details are capable of modification in various, obvious aspects all without departing from the attachment device and seat rail cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the attachment device and seat rail cover and together with the description serve to explain certain principles thereof. In the drawing figures.

Figure 3A:
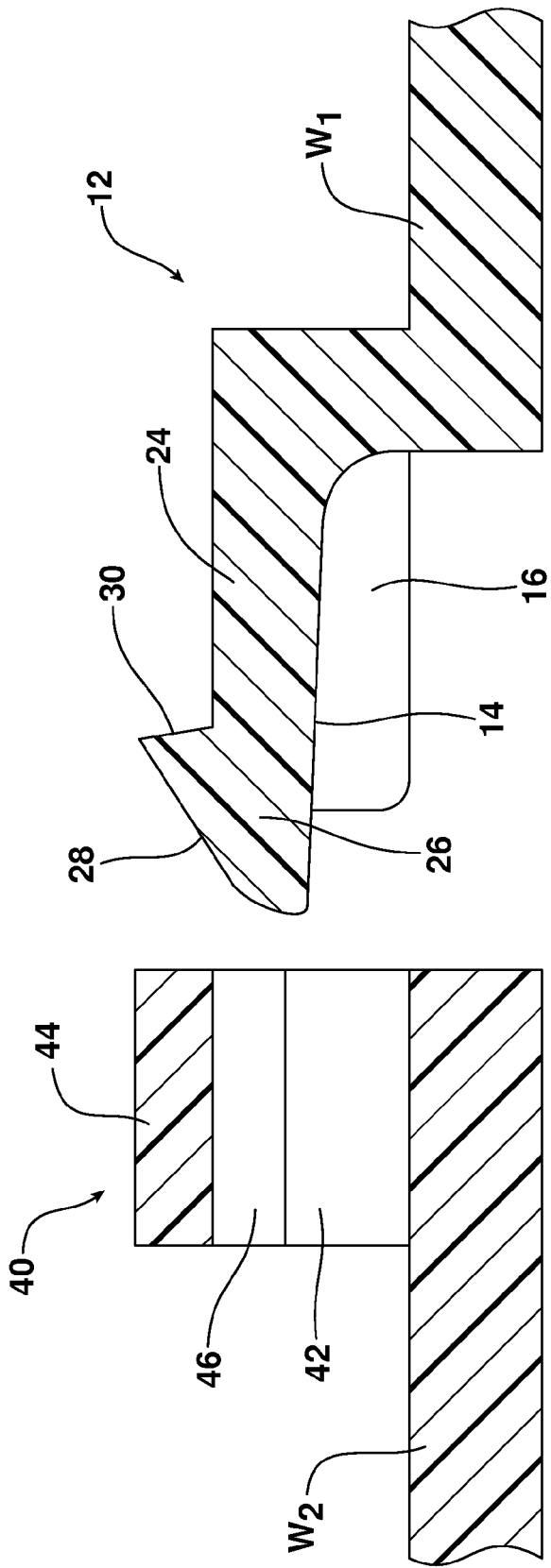
Figure 3B:
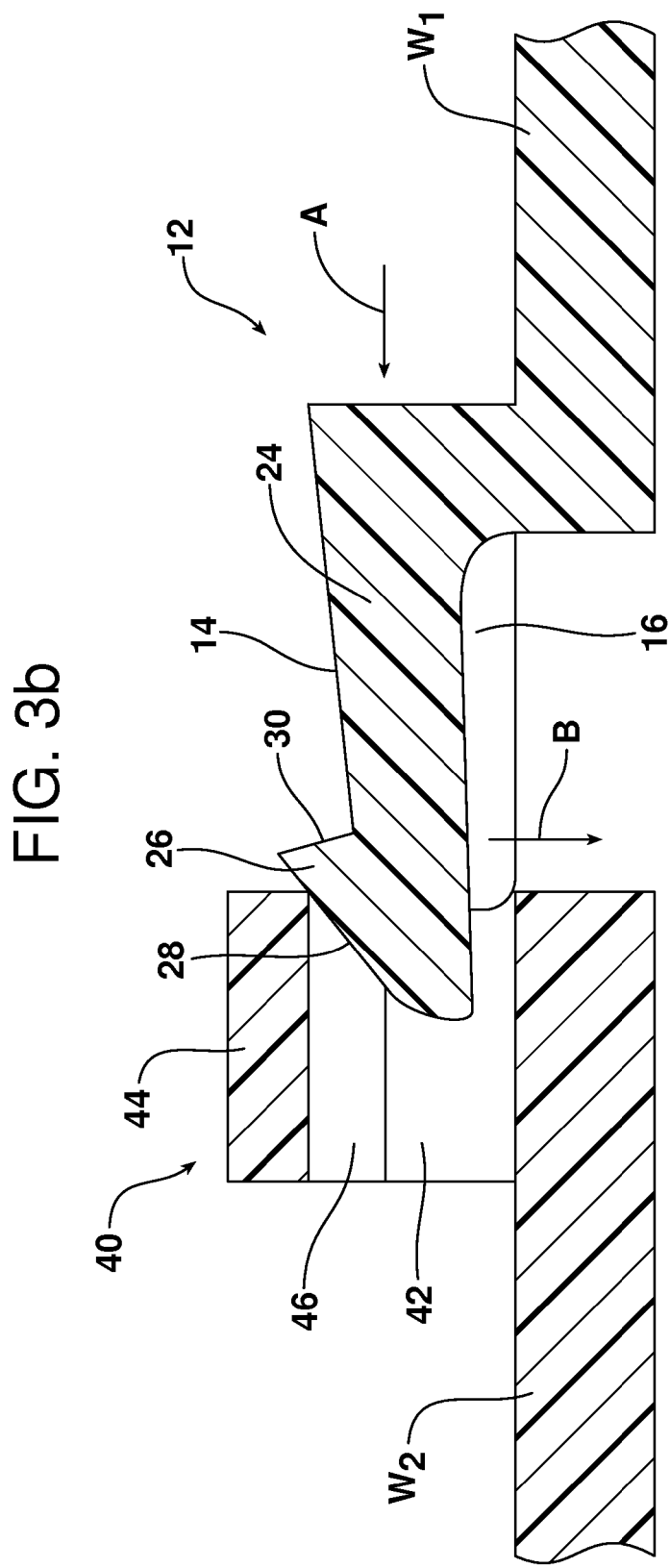
Figure 3C:
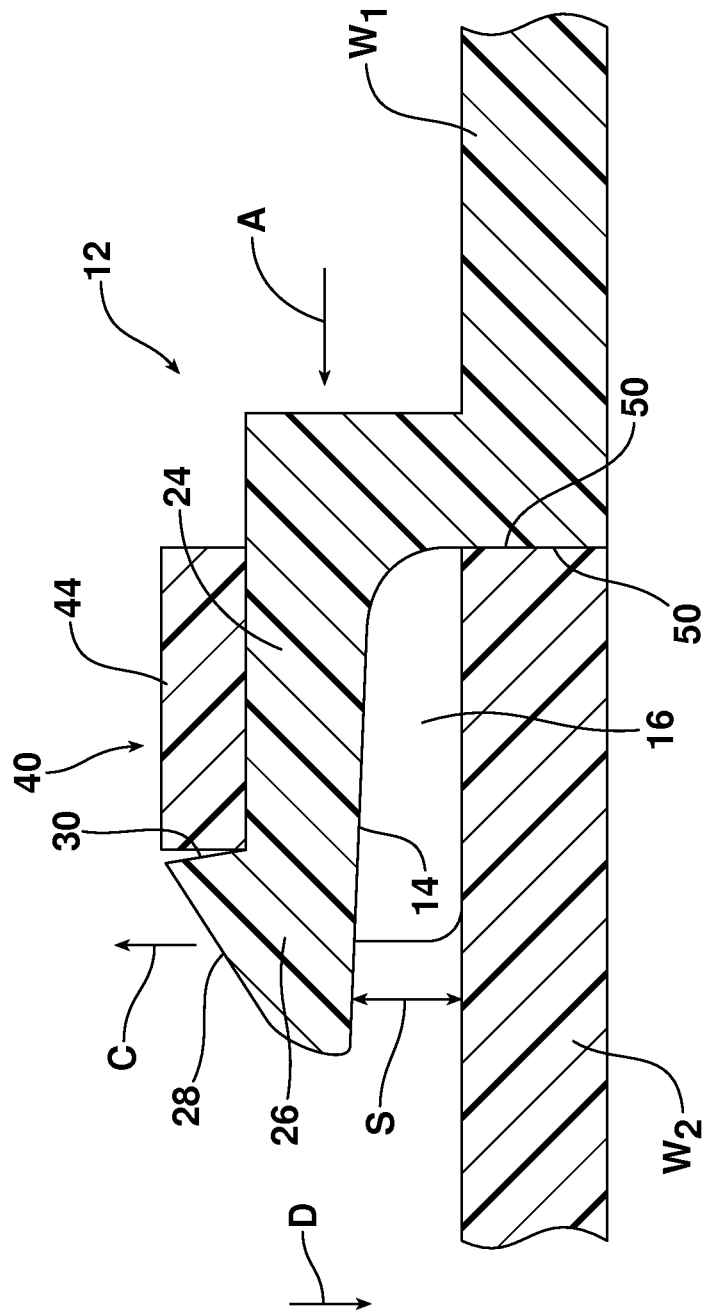

FIGS. 3*a*-3*c* are detailed cross-sectional views illustrating the process of connecting the attachment head to the receiver.

Figure 2:
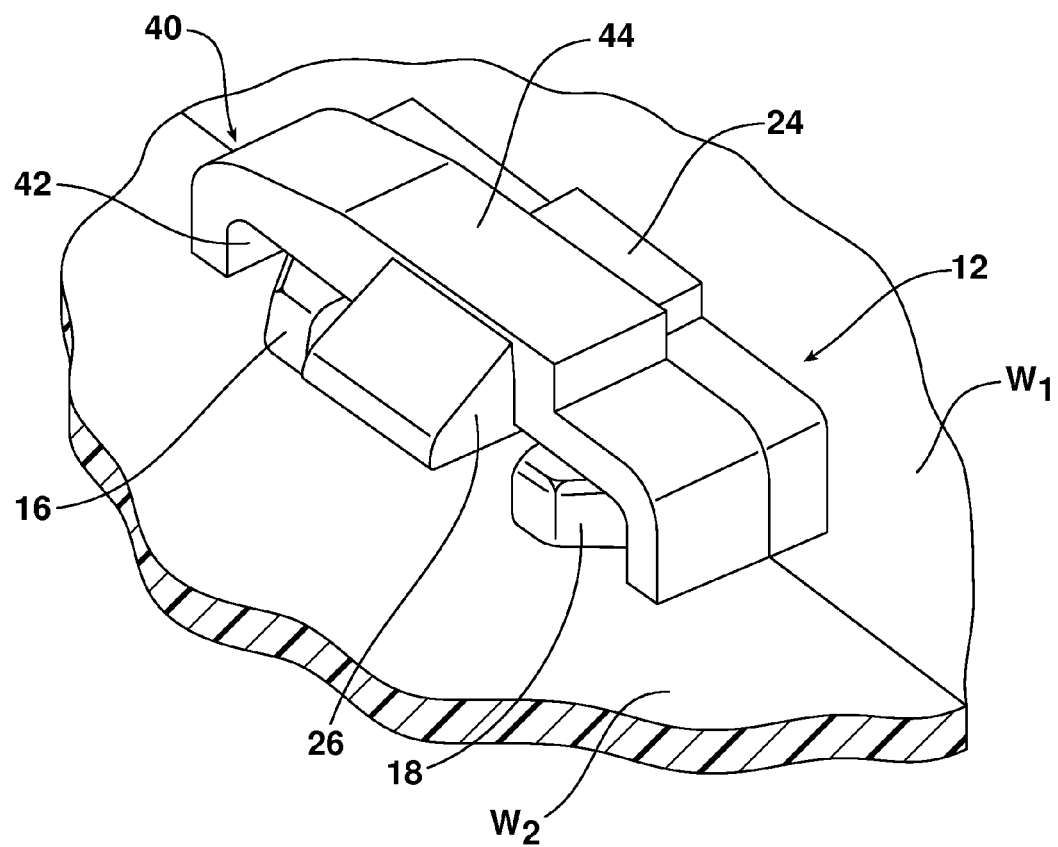
FIG. 2 is a detailed perspective view illustrating the attachment head fully seated and connected to the receiver.

FIG. 4 is a transverse cross-sectional view through the connected attachment head and receiver as illustrated in FIG. 2.

Figure 5:
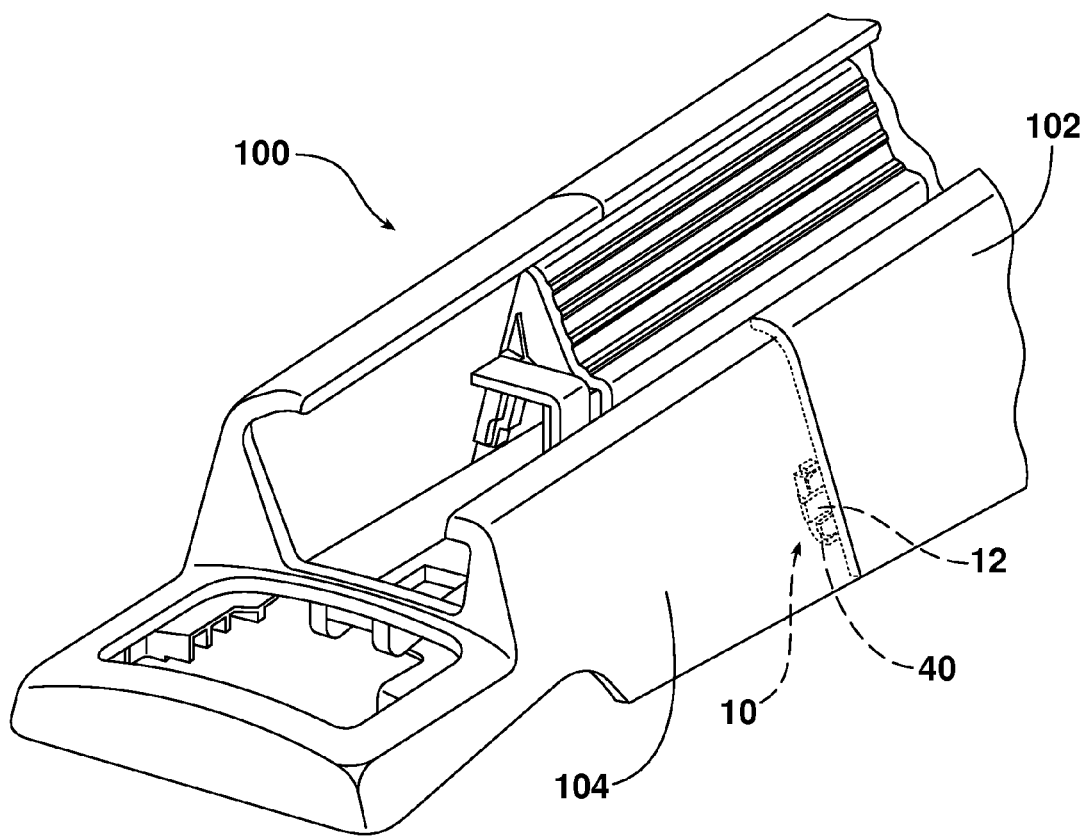

FIG. 5 is a perspective view illustrating the seat rail cover including the attachment device illustrated in FIGS. 1-4.

Reference will now be made in detail to the present preferred embodiments of the attachment device and seat rail cover, examples of which are illustrated in the accompanying drawing figures.

DETAILED DESCRIPTION

Figure 1:
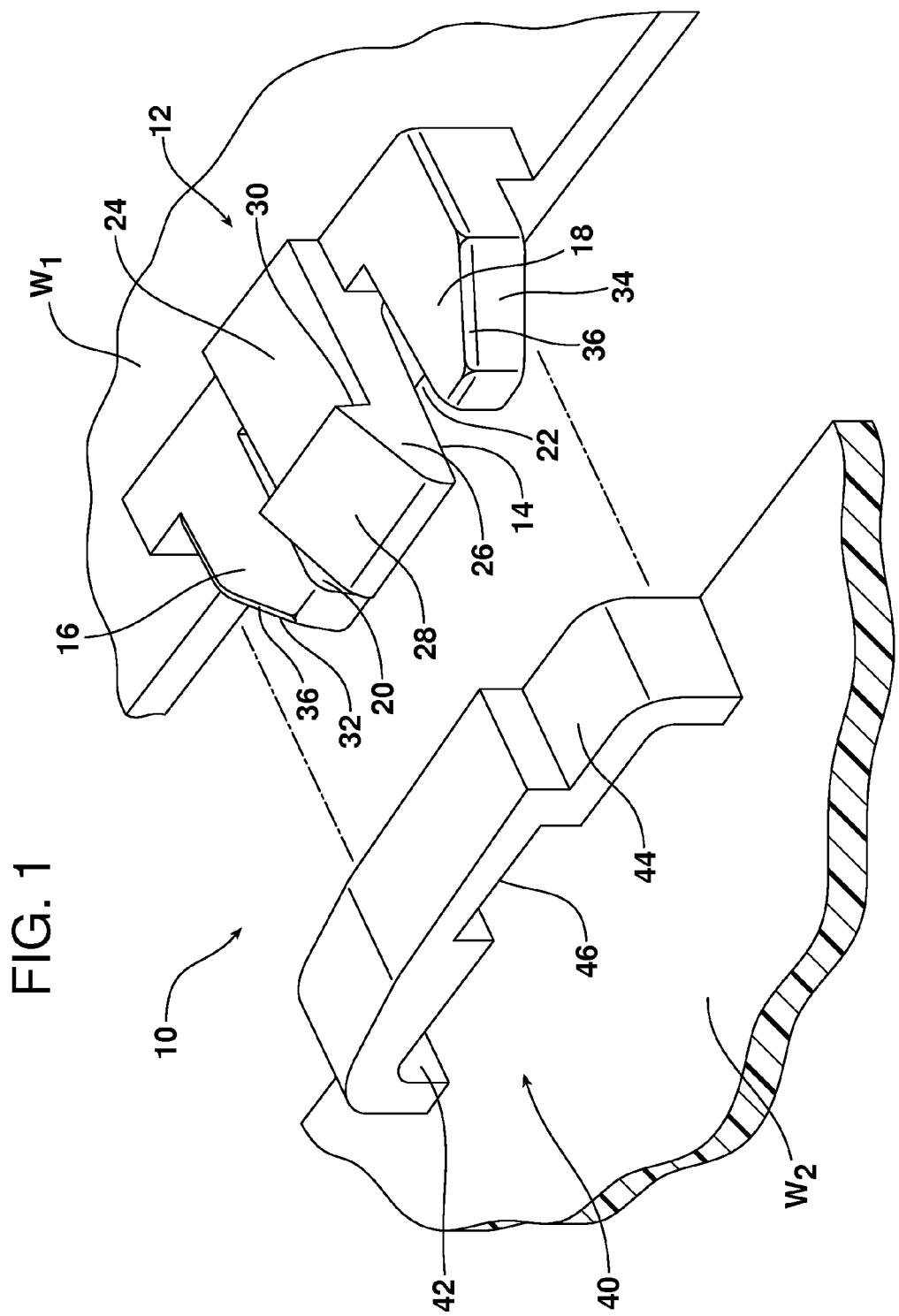
FIG. 1 is an exploded perspective view illustrating the attachment device including an attachment head on a first workpiece and a receiver on a second workpiece.

Reference is now made to FIG. 1 illustrating the attachment device 10 for securing a first workpiece $W_1$ to a second workpiece $W_2$. As illustrated, the attachment device 10 includes an attachment head 12 including a cantilever snap tab 14, a first outboard locator tab 16 and a second outboard locator tab 18. A first gap 20 is provided between the cantilever snap tab 14 and the first outboard locator tab 16. A second gap 22 is provided between the cantilever snap tab 14 and the second outboard locator tab 18.

As further illustrated, the cantilever snap tab 14, includes a resilient cantilever arm 24, a locking lug 26 on a distal end of the cantilever arm and a first cam surface 28 on the locking lug. Further the locking lug 26 includes a locking shoulder 30 that is offset from the first and second outboard locator tabs 16, 18.

As further illustrated, the first outboard locator tab 16 includes a first free end having a first guide surface 32. Similarly, the second outboard locator tab 18 includes a second free end having a second guide surface 34. As should be appreciated, the first and second guide surfaces 32, 34 converge toward the locking lug 26. As further illustrated, the first outboard locator tab 16 and second outboard locator tab 18 both include beveled edges 36. As illustrated in FIG. 1, the attachment head 12 is connected to or carried on the first workpiece $W_1$.

As further illustrated in FIG. 1, the attachment device 10 also includes a receiver 40. The receiver 40 includes an opening 42 for receiving and holding the cantilever snap tab 14, the first outboard locator tab 16 and the second outboard locator tab 18 when the attachment head 12 is fully engaged and seated in the receiver 40 in order to complete the connection of the first and second workpieces $W_1$, $W_2$. In the illustrated embodiment, the receiver 40 comprises a u-shaped band 44. As illustrated, the u-shaped band 44 includes a channel 46 through which a locking lug 26 passes as the attachment head 12 is secured in the receiver 40. As illustrated in FIG. 1, the receiver 40 is connected to or carried on the second workpiece $W_2$. FIG. 2 is a perspective view illustrating the attachment head 12 fully seated and locked in the receiver 40 so that the first and second workpieces $W_1$, $W_2$ are tightly secured together.

Reference is now made to FIGS. 3a-3c illustrating the process of connecting the attachment head 12 with the receiver 40. As illustrated in FIG. 3a, the first step involves generally aligning the attachment head 12 with the receiver 40. The cantilever snap tab 14, first outboard locator tab 16 and second outboard locator tab 18 of the attachment head 12 are then slowly inserted into the opening 42 formed by the band 44. Here it should be appreciated that the narrow end of the first and second guide surfaces 32, 34 engage the band 44 and function to help center the attachment head 12 in the receiver 40 and, more specifically, the cantilever snap tab 14 with the channel 46 in the band 44. As the attachment head 12 and receiver 40 are pushed together (note action arrow A in FIG. 3b) the cam surface 28 engages the band 44 and the resilient cantilever arm 24 pivots in the direction of action arrow B. The channel 46 in the band 44 provides the necessary clearance to allow the locking lug 26 to pass fully underneath the band 44 through the opening 42.

As best illustrated in FIG. 3c, once the attachment head 12 is fully seated in the receiver 40, the locking shoulder 30 clears the band 44 and the resilient cantilever arm 24 returns under resilient memory (note action arrow C) to its home position so that the locking shoulder 30 of the locking lug 26 engages the band 44 thereby locking the attachment head 12 in the receiver 40.

If and when it is ever desired to disconnect the first and second workpieces $W_1$, $W_2$, one presses downwardly on the lug 26 (note action arrow D in FIG. 3c) so as to release the locking shoulder 30 from the band 44 and the attachment head 12 is then pulled back through the opening 42 until it is free from the receiver 40. Here it should be appreciated that the cantilever snap tab 14 is offset from the locator tabs 16, 18 so as to allow the necessary space S to depress the locking lug 26 and free the shoulder 30 from the band 44.

As noted above, the outboard locator tabs 16, 18 include the guide surfaces 32, 34 that aid in centering and securing the attachment head 12 in the receiver 40. The gaps 20, 22 between the cantilever snap tab 14 and the locator tabs 16, 18 ensure that the cantilever arm 24 has sufficient resilient movement to allow the connection of the attachment head 12 with the receiver 40 and the latching and unlatching of the locking shoulder 30 of the locking lug 26 with the band 44. In addition, the outboard locator tabs 16, 18 function to engage the sidewalls 48 of the band 44 thereby limiting or preventing any lateral side to side movement in the attachment device 10 see FIG. 4. Of course, the engagement of the locking shoulder 30 with the band 44 and the abutting surfaces 50 of the two workpieces $W_1$, $W_2$ restrict movement in the transverse direction (see FIG. 3c). Further, the engagement between the relatively rigid locator tabs 16, 18 and the band 44 adjacent the channel 46 on one side and the workpiece $W_1$ on the other restrict movement in the vertical direction (seen FIG. 3c). Consequently it should be appreciated that the attachment device 10 restricts all the degrees of freedom so as to provide a secure and flush connection between the workpieces $W_1$, $W_2$ that prevents rocking and is virtually free of play in any direction.

Reference is now made to FIG. 5 illustrating one possible application for the attachment device 10 in the form of a seat rail cover 100. As illustrated, the seat rail cover 100 includes a first cover section 102 carrying an attachment head 12 as discussed above and illustrated in detail in FIG. 1. Further, the seat rail cover 100 includes a second cover section 104 carrying a receiver 40 including an opening 42 as discussed above and illustrated in detail in FIG. 1. The two cover sections 102, 104 are connected together by the attachment device 10. As described above and illustrated in detail in FIGS. 3a-3c, this is done by inserting the attachment head 12 on the first cover section 102 into the receiver 40 in the second cover section 104 until it is fully seated in a locked-in position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A combination of an attachment device, a first workpiece, and a second workpiece, the attachment device comprising:
    an attachment head carried on said first workpiece, said attachment head including a cantilever snap tab, a first outboard locator tab and a second outboard locator tab, wherein each of the first and second outboard locator tabs having an uppermost planar surface, wherein said cantilever snap tab includes a cantilever arm having a top planar surface, a locking lug on a distal end of said cantilever arm and a first cam surface on said locking lug, and wherein an entirety of the top planar surface of the cantilever arm is positioned in a different horizontal plane above the uppermost planar surface of each of the first and second outboard locator tabs;
    a receiver carried on said second workpiece, said receiver including a substantially u-shaped band defining an opening for receiving and holding said cantilever snap tab, said first outboard locator tab and said second outboard locator tab, wherein said substantially u-shaped band includes a channel; and
    a first gap between said cantilever snap tab and said first outboard locator tab and a second gap between said cantilever snap tab and said second outboard locator tab; and wherein said locking lug passes through said channel as said attachment head is secured to said receiver;
    wherein said first outboard locator tab includes a first free end having a first guide surface and said second outboard locator tab includes a second free end having a second guide surface, and wherein said first guide surface and said second guide surface converge toward said locking lug.

2. The combination of claim 1, wherein said locking lug includes a locking shoulder offset from said first outboard locator tab and said second outboard locator tab.

3. The combination of claim 2, wherein said first outboard locator tab and said second outboard locator tab both include beveled edges.

4. A seat rail cover, comprising:
a first cover section carrying an attachment head including a cantilever snap tab, a first outboard locator tab and a second outboard locator tab, wherein each of the first and second outboard locator tabs having an uppermost planar surface, wherein said cantilever snap tab includes a cantilever arm having a top planar surface, a locking lug on a distal end of said cantilever arm and a first cam surface on said locking lug, and wherein an entirety of the top planar surface of the cantilever arm is positioned in a different horizontal plane above the uppermost planar surface of each of the first and second outboard locator tabs;
a second cover section carrying a receiver including a substantially u-shaped band defining an opening for receiving and holding said cantilever snap tab, said first outboard locator tab and said second outboard locator tab, said substantially u-shaped band includes a channel; and
a first gap between said cantilever snap tab and said first outboard locator tab and a second gap between said cantilever snap tab and said second outboard locator tab and wherein said locking lug passes through said channel as said attachment head is secured to said receiver;
wherein said first outboard locator tab includes a first free end having a first guide surface and said second outboard locator tab includes a second free end having a second guide surface, and wherein said first guide surface and said second guide surface converge toward said locking lug.

5. The seat rail cover of claim 4, wherein said locking lug includes a locking shoulder offset from said first outboard locator tab and said second outboard locator tab.

6. The seat rail cover of claim 5, wherein said first outboard locator tab and said second outboard locator tab both include beveled edges.

\* \* \* \* \*